No. 662,909. Patented Dec. 4, 1900.
J. W. BRAY.
ACETYLENE GAS BURNER.
(Application filed July 10, 1900.)

(No Model.)

WITNESSES:
Ella L. Giles
Otto Munk

INVENTOR:
John William Bray
BY
Richards
ATTORNEYS.

UNITED STATES PATENT OFFICE.

JOHN W. BRAY, OF LEEDS, ENGLAND.

ACETYLENE-GAS BURNER.

SPECIFICATION forming part of Letters Patent No. 662,909, dated December 4, 1900.

Application filed July 10, 1900. Serial No. 23,156. (No model.)

*To all whom it may concern:*

Be it known that I, JOHN WILLIAM BRAY, a subject of the Queen of Great Britain and Ireland, whose postal address is Bagby Works, Leeds, in the county of York, England, have invented certain new and useful Improvements in Acetylene-Gas Burners; and I do hereby declare the following to be a full, clear, and exact description of the invention, such as will enable others skilled in the art to which it appertains to make and use the same.

This invention relates to certain improvements in the manufacture of acetylene-gas burners, and has for its object the production of a light in which the whole of the gas is consumed with a minimum deposit of carbon.

I accomplish my object in the following manner: I first construct the burner in two parts, an upper and lower, and ultimately combine the two by heat. The upper and lower portions of the burner are formed of porcelain or other suitable non-corrosive material.

In order that my invention may be better understood, reference is made to the accompanying sheet of drawings, in which—

Figure 1:
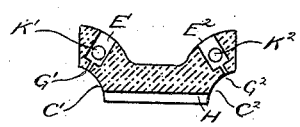
Figure 2:
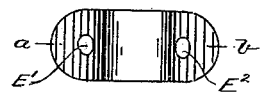
Figure 3:
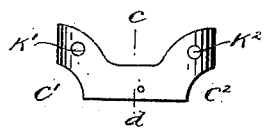
Figure 4:
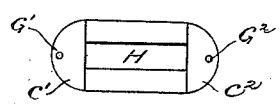
Figure 5:
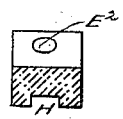
Figure 6:
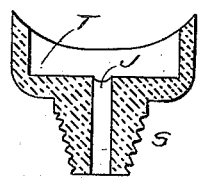
Figure 7:
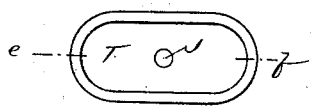
Figure 8:
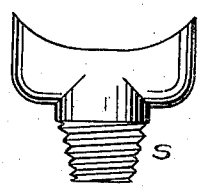
Figure 9:
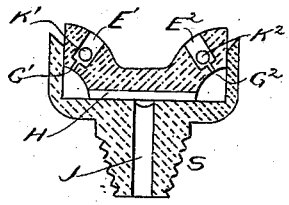
Figure 10:
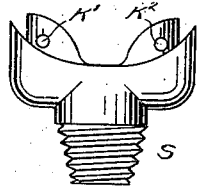

Figure 1 represents the upper portion of the gas-burner cut through the center line $a$ $b$ of Fig. 2. Fig. 2 is a plan of the upper portion of the burner. Fig. 3 is an outside elevation of the upper portion of the burner. Fig. 4 is a bottom view of the upper portion of the burner. Fig. 5 is a cross-section of the upper portion of the burner through line $c d$ of Fig. 3. Fig. 6 is a sectional elevation of the lower portion of the gas-burner through line $e f$ of Fig. 7. Fig. 7 represents a plan of the lower portion of the gas-burner. Fig. 8 is an outside elevation of the bottom portion, while Fig. 9 is a sectional elevation of the upper and lower portions when combined to form a complete burner, and Fig. 10 is an outside elevation of the complete burner.

Corresponding letters of reference indicate corresponding parts where they appear, and all the views are drawn to a larger scale than the actual size of the burner or its component parts.

In describing the invention in detail Fig. 1 represents a vertical longitudinal section of the upper portion of the gas-burner, with two openings $E'$ and $E^2$, of cylindrical form, at an angle to the vertical and terminating on the under side in fine orifices $G'$ $G^2$. On the bottom of this portion of the gas-burner is a channel H, of suitable section, extending from end to end, where the under side is preferably curved at $C'$ $C^2$. Between the top and bottom of the cylindrical openings $E'$ and $E^2$ are the respective openings $K'$ and $K^2$, rather smaller in diameter than the before-mentioned openings $E'$ and $E^2$, passing at right angles through $E'$ and $E^2$ for the purpose of admitting air to mix with the gas flowing through the small orifices $G'$ and $G^2$. The relationship of the two openings $E'$ and $E^2$ to each other is shown by Fig. 2. From these openings the mixture of gas and air issues and, meeting in the middle, forms, when lighted, a flat flame between the two openings $E'$ and $E^2$. For the relationship of these openings I make no claim whatever.

In Fig. 3 an outside view is shown of the upper portion of the burner and the position of the air-openings $K'$ and $K^2$.

The under side of the upper portion of the burner is provided with a channel H, communicating with the divergent curved ends $C'$ and $C^2$. The positions of the channel H and small orifices $G'$ and $G^2$ are shown by Fig. 4. The channel H is formed along the under side of the upper portion of the burner, so that when the combination is made by the fixing of the upper to the lower portion the gas can pass along the said channel to the fine orifices $G'$ and $G^2$.

The sectional elevation Fig. 5 shows the channel H and the opening $E^2$.

A sectional elevation through line $e f$ of Fig. 7 is shown by Fig. 6, representing the lower portion of the burner. The opening J is for the admission of the gas to the burner. The shank S is prepared with a screw-thread for insertion in the gas-fitting, while a recess at T is formed for the reception of the upper portion of the burner.

A plan of the lower portion is represented by Fig. 7, showing the recess T for the reception of the upper portion of the burner and the opening J for the gas-supply, while Fig. 8 shows an elevation of the lower portion of the burner.

A vertical sectional elevation of the upper and lower portions of the gas-burner when combined together is shown by Fig. 9. After placing the upper and lower portions together they are then coated with a suitable glazing mixture and subjected to heat, so as to combine the same—that is, the upper and lower parts—into one complete and gas-tight burner. The burner is now ready for gas to be admitted through the opening J, which passes through same to the channel H, where it divides, traveling to the right and left, escaping through the fine orifices $G'$ and $G^2$ into the cylindrical openings $E'$ and $E^2$, where it mixes with air entering through the openings $K'$ and $K^2$, which openings are made from side to side to the cylindrical openings $E'$ and $E^2$. The admixture of gas and air issuing from $E'$ and $E^2$ and impinging in the center produces a flat flame when lighted, with a minimum deposit of carbon on the tip of the burner.

What I claim as my invention is—

An acetylene-burner comprising the lower part having a recess T in its upper side, and an upper part having the divergent ends $C'$, $C^2$, provided with inwardly-directed openings for the gas and with laterally-extending openings for the air communicating with the gas-openings, said upper portion having also a channel H extending from side to side thereof, said channel forming with the bottom of the recess of the lower part of the burner a conduit to direct the gas laterally, substantially as described.

In testimony whereof I have hereunto set my hand in the presence of two witnesses.

JOHN W. BRAY.

Witnesses:
P. CLAPHAM,
WM. PREST.